(12) United States Patent
Iigahama et al.

(10) Patent No.: US 6,211,932 B1
(45) Date of Patent: *Apr. 3, 2001

(54) FRESNEL LENS AND LIQUID CRYSTAL DISPLAY DEVICE

(75) Inventors: Yukio Iigahama; Motohiko Fukuhara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/548,086

(22) Filed: Apr. 11, 2000

Related U.S. Application Data

(62) Division of application No. 08/948,624, filed on Oct. 10, 1997, which is a division of application No. 08/508,632, filed on Jul. 28, 1995, now Pat. No. 5,751,387.

(51) Int. Cl.[7] ....................... G02F 1/1335; G02F 1/1333; G02F 1/13; G02F 1/133; G03B 21/60
(52) U.S. Cl. .................... 349/95; 349/84; 349/5; 349/73; 359/457
(58) Field of Search ..................... 349/5, 75, 95, 349/117, 84; 359/457, 565; 353/31

(56) References Cited

U.S. PATENT DOCUMENTS

| | | | |
|---|---|---|---|
| 3,004,470 | 10/1961 | Ruhle | 359/792 |
| 3,784,282 | 1/1974 | Yamazaki et al. | 359/792 |
| 4,408,836 | 10/1983 | Kikuno | 349/73 |
| 4,756,603 | 7/1988 | Ohtani | 359/601 |
| 4,936,657 | 6/1990 | Tejima et al. | 349/57 |
| 5,066,099 | 11/1991 | Yoshida et al. | 359/457 |
| 5,191,472 | 3/1993 | Kurematsu et al. | 359/619 |
| 5,191,479 | 3/1993 | Tsuchida | 359/742 |
| 5,206,761 | 4/1993 | Ogino | 359/457 |
| 5,264,879 | 11/1993 | Shikama | 349/8 |
| 5,355,187 | 10/1994 | Ogino et al. | 353/38 |
| 5,371,617 | 12/1994 | Mitsutake et al. | 349/8 |
| 5,398,125 | 3/1995 | Willett et al. | 349/95 |
| 5,426,531 | 6/1995 | Tsukagoshi | 359/457 |
| 5,434,706 | 7/1995 | Mitani et al. | 359/457 |
| 5,504,597 | 4/1996 | Sprague et al. | 349/57 |
| 5,504,598 | 4/1996 | Sprague et al. | 349/57 |
| 5,751,387 | 5/1998 | Iigahama | 349/95 |
| 5,812,226 | 9/1998 | Izumi et al. | 349/73 |

FOREIGN PATENT DOCUMENTS

| | | |
|---|---|---|
| 0312341 | 4/1989 | (EP) . |
| 0581221 | 2/1994 | (EP) . |
| 0645661 | 3/1995 | (EP) . |
| 58-037630 | 5/1983 | (JP) . |
| 58-122527 | 7/1983 | (JP) . |
| 58-33526 | 7/1983 | (JP) . |
| 58-122527 | 10/1983 | (JP) . |
| 5188340 | 11/1985 | (JP) . |
| 61-12249 | 4/1986 | (JP) . |
| 62-180755 | 8/1987 | (JP) . |
| 62-200302 | 9/1987 | (JP) . |
| 62-201401 | 9/1987 | (JP) . |
| 17001 | 1/1989 | (JP) . |
| 60227233 | 1/1989 | (JP) . |
| 2150186 | 6/1990 | (JP) . |
| 4338937 | 11/1992 | (JP) . |

*Primary Examiner*—William L. Sikes
*Assistant Examiner*—Toan Ton
(74) *Attorney, Agent, or Firm*—Greer, Burns & Crain, Ltd.

(57) ABSTRACT

A display device including liquid crystal display panels, arrays of convergently transmissive elements for forming an erect and real image, and fresnel lenses for magnifying the image. The configured surface of the fresnel lens is arranged on the light incident side. The configured surface includes periodic ridges with flat crests and inclined surfaces. Shading layers are provided on the flat crests to eliminate ghosts.

26 Claims, 9 Drawing Sheets

FRESNEL LENS AND LIQUID CRYSTAL DISPLAY DEVICE

This is a divisional of application Ser. No. 08/948,624, filed Oct. 10, 1997, which is a Divisional of application Ser. No. 08/508,632, filed Jul. 28, 1995 U.S. Pat. No. 5,751,387.

BACKGROUND OF THE INVENTION

1. Field of the Invention

The present invention relates to a fresnel lens having a shading layer and a display device such as a liquid crystal display device including magnifying fresnel lenses.

2. Description of the Related Art

Liquid crystal display devices can have relatively thin structures and have been used for many applications. Recently, projection type liquid crystal display devices having larger screens have been developed. A typical projection type liquid crystal display device includes a projection lens which projects a magnified image onto a screen. Also, optical elements other than a projection lens can be used for magnifying an image.

For example, Japanese Unexamined Patent Publication (Kokai) No. 5-188340 discloses a projection type liquid crystal display device including liquid crystal display panels, fresnel lenses for magnifying images produced by liquid crystal display panels, and a screen. In this case, the liquid crystal display device also includes arrays of convergently transmissive elements, and a screen. Each of the arrays of convergently transmissive elements is adapted to form an erect and real image having an identical size to an object, and each of the fresnel lenses serves to magnify the image from the array of convergently transmissive elements.

The convergently transmissive elements are made from plastic or glass in the form of transparent rods having the diameter of 1 mm to 2 mm, so that refractive index changes in each of the transparent rods in the radial direction thereof. By appropriately selecting the length and the distribution of refractive index thereof, it is possible to use each of the convergently transmissive elements so that it can form an erect and real image having an identical size to an object. A plurality of convergently transmissive elements are arranged in a close relationship to each other with the end surfaces of the elements arranged in a line or in a plane, to thereby form a row or an array of convergently transmissive elements. The array of convergently transmissive elements can be used as an imaging device for producing an erect and real image having an identical size to an object. The imaging device using the array of convergently transmissive elements has advantages, compared with a usual spherical lens, in that a focal distance is very short and an optical performance is uniform in the line or plane so that an adjustment of the distance between the lenses is not necessary.

However, when the array of convergently transmissive elements is used as the imaging device, it is not possible to change a magnification of the image although it is possible for individual convergently transmissive elements to be changed in magnification by changing the length of the elements. This is because magnified images produced by the individual convergently transmissive elements are inconsistently superposed, one on another, in the array and a normal image cannot be formed. Therefore, the array of convergently transmissive elements can be used only as a full size imaging device, and it is necessary to provide a magnifying means in addition to the array of convergently transmissive elements.

Japanese Examined Patent publications (Kokoku) No. 58-33526 and No. 61-12249 disclose an imaging device including an array of convergently transmissive elements and a convex lens or a concave lens as a magnifying means which is arranged on the inlet side or on the outlet side of the array of convergently transmissive elements. The convex lens or the concave lens can be of a single lens or a composite lens of a plurality of lens components to realize a desired magnification. However, when this imaging device is used with a magnifying device in a liquid crystal display device, a problem arises in that resolving power of the lens changes from the central portion to the peripheral region.

It has been found that a good image is obtained if the resolving power MTF is greater than 50 percent under the condition of 4 (1 p/mm) i.e., 4 pairs of white and black spots per millimeter. However, it is generally difficult to establish an image having resolving power MTF greater than 50 percent in the above described prior art. It is necessary that light passes through the peripheral region of the liquid crystal display panel at an angle of approximately 10 degrees relative to the normal line of the liquid crystal display panel in order to ensure resolving power MTF greater than 50 percent. The smaller the angle at the peripheral region is, the smaller the magnification of the device is. As a result, it is not possible to realize a liquid crystal display device having a thin structure if a convex lens or a concave lens is used with an array of convergently transmissive elements, although the array of convergently transmissive elements by itself can provide a liquid crystal display device having a thin structure.

Accordingly, a magnifying element is desired which can be used with an array of convergently transmissive elements and which can realize a liquid crystal display device having a thin structure. The use of a fresnel lens with an array of convergently transmissive elements is disclosed in the above described Japanese Unexamined Patent Publication (Kokai) No. 5-188340, but the manner in which the fresnel lens is used is not described in this prior art. The inventors have recently found that a good result is obtained if a fresnel lens is used as a magnifying element.

Further, in a liquid crystal display device, there is a problem that brightness of an image on a peripheral region of the screen is reduced relative to the brightness of the image on the central region of the screen.

SUMMARY OF THE INVENTION

The object of the present invention is to provide a fresnel lens constructed such that light is made incident to a configured surface thereof.

Another object of the present invention is to provide a display device having a thin structure by appropriately arranging a fresnel lens.

Another object of the present invention is to provide a display device in which the brightness of a screen is improved.

According to one aspect of the present invention, there is provided a fresnel lens comprising a body having a flat surface and a configured surface with periodic ridges, each of the ridges including a flat crest extending generally parallel to the flat surface and at least one inclined surface extending from the flat crest toward the flat surface, and a shading layer provided on the flat crest of each of the ridges.

Preferably, the flat crests have varying widths depending on the positions of the ridges. In this case, the at least one inclined surface comprises a main inclined surface arranged on one side of the flat crest and designed such that light is mainly incident to the body from the main inclined surface and a minor inclined surface arranged on the other side of the flat crest from the main inclined surface.

Preferably, the width of the flat crest is determined by the following relationship:

$$d = p \frac{\tan r}{\tan(90 - \theta 1) + \tan r} \times \left[1 - \frac{\tan\theta 2}{\tan r}\right] \quad (1)$$

where d is the width of the flat crest, p is the pitch of the ridges, r is the angle of a major light ray made incident to the body from the main inclined surface relative to the axis, $\theta_1$ is the angle the main inclined surface relative to the flat surface, and $\theta_2$ is the angle of the minor inclined surface relative to the axis.

According to a further aspect of the present invention, there is provided a display device comprising at least one image modulator, an array of convergently transmissive elements receiving light from said at least one image modulator for forming an erect and real image, a fresnel lens including a body having a flat surface and a configured surface with neriodic ridges, the fresnel lens being arranged so that light is made incident from the array of convergently transmissive elements to the configured surface of the fresnel lens, and a screen receiving light from said at least one image modulator via the array of convergently transmissive elements and the fresnel lens.

Preferably, each of the ridges includes a flat crest extending generally parallel to the flat surface and at least one inclined surface extending from the flat crest toward the flat surface, and a shading layer is provided on the flat crest of each of the ridges.

Preferably, the flat crests have varying widths depending on the positions of the ridges. Preferably, the at least one inclined surface comprises a main inclined surface arranged on one side of the flat crest and designed such that light is mainly incident to the body from the main inclined surface and a minor inclined surface arranged on the other side of the flat crest from the main inclined surface.

Preferably, the at least one image modulator comprises a plurality of liquid crystal display panels, and the array of convergently transmissive elements and the fresnel lens are arranged for every liquid crystal display panel. Preferably, four sets of the liquid crystal display panels, the arrays of convergently transmissive elements and the fresnel lenses are arranged, with each set arranged in respective quarter portions in a rectangular region, the screen having a total display area four times greater than a display area necessary to receive an image from one set of the liquid crystal display panel, the array of convergently transmissive elements and the fresnel lens.

Preferably, a partition is arranged on or near the screen between two adjacent sets of the liquid crystal display panels, the arrays of convergently transmissive elements and the fresnel lenses for preventing light from straying from one set into the adjacent set.

Preferably, the screen has a predetermined display area, and said at least one image modulator has a main display area and a peripheral compensating area arranged such that the main display area forms an image on the predetermined display area via the array of convergently transmissive elements and the fresnel lens and the peripheral compensating area forms an image just outside the predetermined display area via the array of convergently transmissive elements and the fresnel lens. Preferably, the peripheral compensating area of said at least one image modulator is controlled to provide an image which is generally identical to a portion of an image delivered from the main display area of the at least one image modulator near the peripheral compensating area.

Preferably, between two adjacent liquid crystal display panels, said peripheral compensating area of one liquid crystal display panel is controlled to provide an image which is generally identical to a portion of an image delivered from the main display area of the adjacent liquid crystal display panel near the peripheral compensating area of said one liquid crystal display panel.

According to a further aspect of the present invention, there is Provided a display device comprising at least one image modulator, optical lens for magnifying an image output by said at least one image modulator, a screen for receiving an image from said at least one image modulator via said optical lens, the screen having a predetermined display area, and said at least one image modulator has a main display area and a peripheral compensating area arranged such that the main display area forms an image on the predetermined display area via said optical lens and the peripheral compensating area forms an image just outside the predetermined display area via said optical lens.

BRIEF DESCRIPTION OF THE DRAWINGS

The present invention will become more apparent from the following description of the preferred embodiments, with reference to the accompanying drawings in which.

DESCRIPTION OF THE PREFERRED EMBODIMENT

Figure 1:
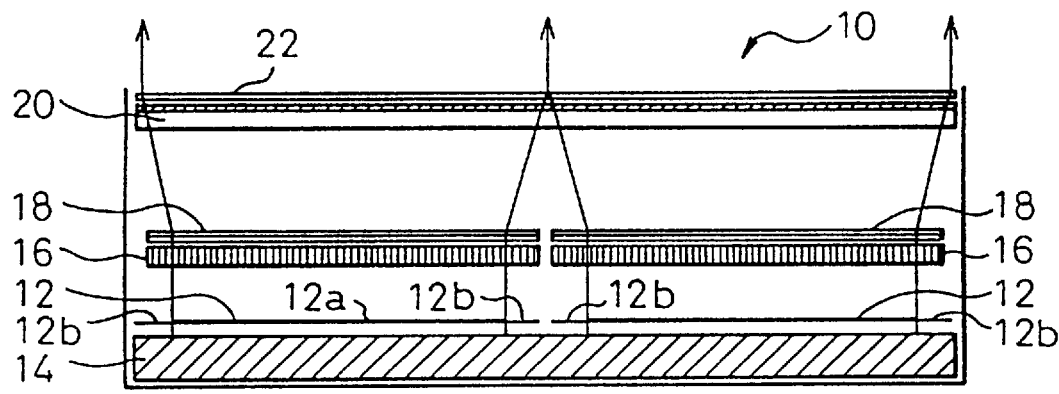
FIG. 1 is a cross-sectional view of a liquid crystal display device according to the embodiment of the present invention.
Figure 2:
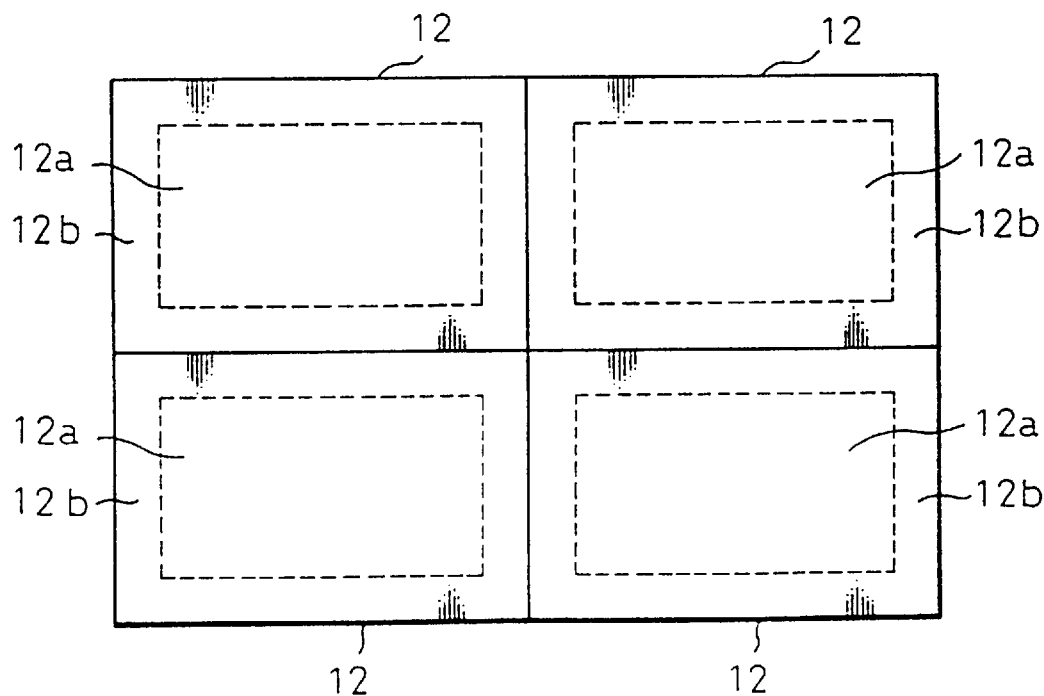
FIG. 2 is a plan view illustrating the arrangement of four liquid crystal display panels of FIG. 1.

FIGS. 1 and 2 show the liquid crystal display device 10 according to the present invention. The liquid crystal display device 10 includes four liquid crystal display panels 12 which are arranged in respective quarter portions in a rectangular region. Each liquid crystal display panel 12 includes an effective display region 12a and a non-display region 12b around the effective display region 12a, the non-display region 12b being necessary for attaching a drive circuit or the like to the panel for driving the liquid crystal in the panel. Therefore, an image is not formed on the non-display region 12b and a discontinuous image is formed if four liquid crystal display panels 12 are directly seen. The embodiment realizes a continuous multi-display from discontinuous images from four liquid crystal display panels 12 by providing a magnifying element.

In FIG. 1, the liquid crystal display device 10 includes a backlight 14 on the rear side of the panels 12, and arrays 16 of convergently transmissive elements on the front side of the respective panels 12. The area of each of the arrays 16 of convergently transmissive elements is larger than the area of the effective display region 12a, but smaller than the total area of the panel 12 including the non-display region 12b. Each array 16 of convergently transmissive elements can form an erect and real image having an identical size to an object, i.e., an image produced by the liquid crystal display panel 12.

Figure 8:
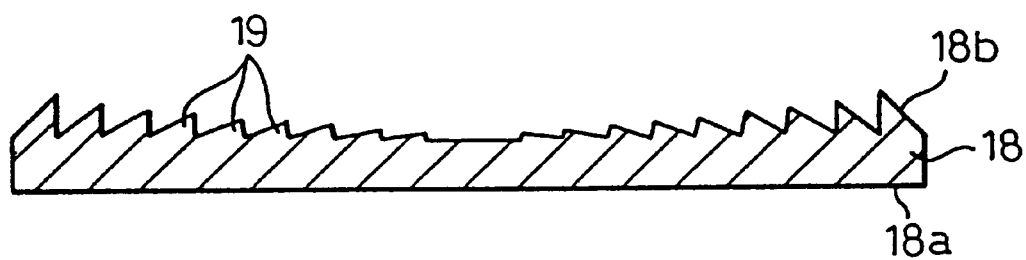
FIG. 8 is a cross-sectional view of the fresnel lens of FIG. 1.
Figure 9:
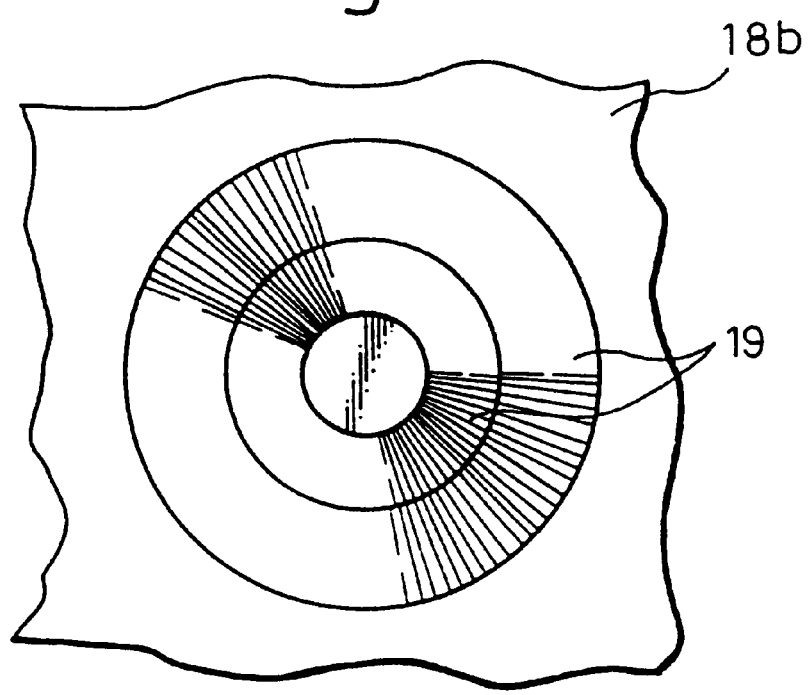
FIG. 9 is a partial plan view of the fresnel lens of FIG. 8.

The liquid crystal display device 10 includes fresnel lenses 18 on the output side of the arrays 16 of convergently transmissive elements, respectively. Each fresnel lens 18 includes a transparent body having a flat surface 18a and a configured surface 18b, in a saw-shaped cross-section, with concentrically periodic ridges 19 as shown in FIGS. 8 and 9. In the present invention, the fresnel lens 18 is arranged such that light is mainly incident onto the configured surface 18b of the fresnel lens 18. In the arrangement of FIG. 1, the configured surface 18b faces the array 16. The flat surface 18a is thus arranged on the light emerging side.

The liquid crystal display device 10 also includes a screen 22 having a screen fresnel lens 20 on the front side of the fresnel lenses 18. Light beams emerging from the fresnel lenses 18 divergently travel toward the screen 22 so that light beams emerging from the adjacent fresnel lenses 18 meet on the screen 22 without a discontinuity. Therefore, the non-display regions 12b of the liquid crystal display panels 12 cannot be seen by a person watching the screen 22. The liquid crystal display panels 12 are one example of an image modulating means, and other types of image modulating means, which merge light, can be used.

Figures 3A, 3B, 3C:
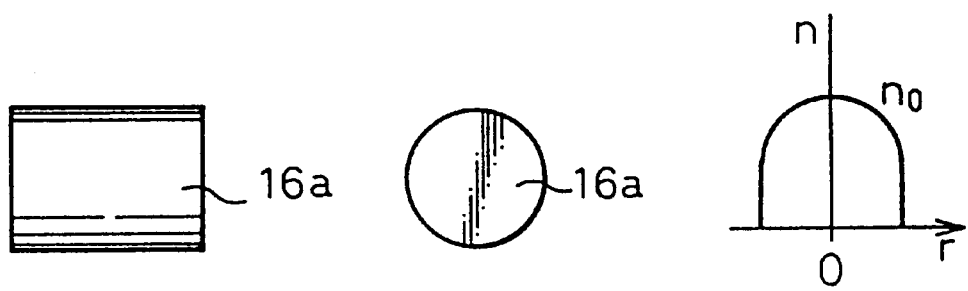
FIGS. 3A to 3C are views illustrating the feature of one of the convergently transmissive elements of FIG. 1.

The array 16 comprises a plurality of convergently transmissive elements 16a and the features of one of the convergently transmissive elements 16a is shown in FIGS. 3A to 3C. The convergently transmissive element 16a is made from plastic or glass in the form of transparent rod having the diameter of 1 mm to 2 mm. The refractive index of the element 16a changes in the body thereof in the radial direction, as shown in FIG. 3C. The distribution of the refractive index n(r) is represented by the following quadratic function $$n(r)=n_0(1-g^2r^2/2)$$

where r is the distance from the vertical axis, $n_0$ is refractive index on the vertical axis, and g is a distribution constant of the refractive index.

Figure 4:
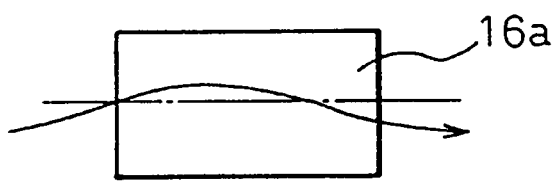
FIG. 4 is a view illustrating the propagration of light in the convergently transmissive element.
Figure 5:
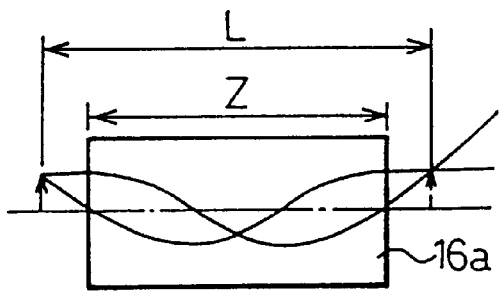
FIG. 5 is a view illustrating formation of an erect and real image having an identical size to an object.

Light enters the convergently transmissive element 16a from its end surface and is bent toward a portion thereof at which the refractive index is higher while light passes through the convergently transmissive element 16a, so that light travels along a periodically snaked course, as shown in FIG. 4. The cycle P is expressed by $P=2\pi/g$. If the length Z of the convergently transmissive element 16a is selected from the relationship of $P/2<Z<3P/4$, an erect and real image having an identical size to an object can be formed, as shown in FIG. 5. The distance L is the distance between the object and the image.

Figure 6:
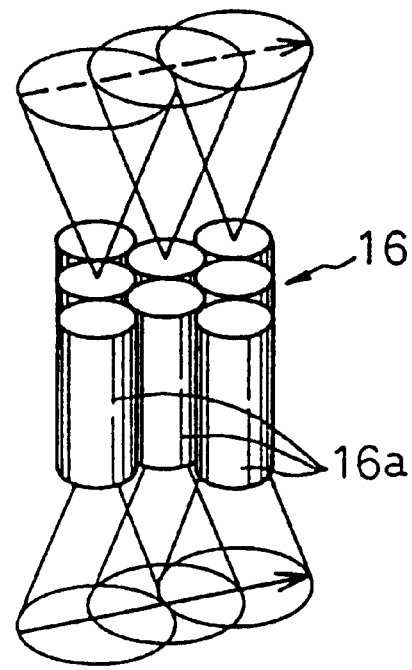
FIG. 6 is a diagrammatic perspective view of an array of convergently transmissive elements of FIG. 1.

FIG. 6 shows that the convergently transmissive elements 16a are arranged in a close relationship to each other with the end surfaces thereof arranged in a line or in a plane, to thereby form the array 16. An erect and real image having an identical size to an object can be formed by the array 16. The imaging device using the array 16 of convergently transmissive elements 16a offers advantages in that a focal distance is very short, and the optical performance is uniform in the line or plane. However, it is not possible for the array 16 of convergently transmissive elements 16a to change the magnification of the image relative to an object, although it is possible for individual convergently transmissive elements 16a to change the magnification if the length of the elements 16 is changed. This is because magnified images formed by the individual convergently transmissive elements 16a are inconsistently superposed one on another in the array 16 and a normal image is not formed in the array 16. Therefore, the array 16 of convergently transmissive elements 16a can be used only as a full size imaging device, and the fresnel lenses 18 are used as a magnifying means.

In the embodiment, the area of the effective region 12a of the liquid crystal display panel 12 is 211.2 mm×158.4 mm, and the required magnification (a value of the sum of the area of the effective region 12a and the area of the ineffective region 12 divided by the area of the effective region 12a) is 1.09. Regarding the convergently transmissive elements 16a, the refractive index n is 1.507, the distribution constant of refractive index g is 0.1847, the length Z is 18.89 mm, and the diameter is 1.18 mm. The magnifying fresnel lens 18 is made from an acryl having a refractive index of 1.494 and a radius of curvature in which the central curvature (cuy) is −0.00813668, the secondary constant is $-0.775202\times10^{-8}$, the tertiary constant is $0.318549\times10^{-13}$, the quartic constant is $-0.720974\times10^{-19}$, and the quintic constant is $-0.717576\times10^{-25}$. The angle (AEP) of light emerging from the outermost peripheral position of the fresnel lens 18 relative to the normal line of the fresnel lens 18 is 28.3 degrees. The screen fresnel lens 20 serves to convert light beams emerging from the magnifying fresnel lens 18 with a variety of angles into parallel light beams, and is made from MS having a refractive index of 1.537. The resolving power MTF in this example is shown in the following table.

| AEP (°) | MTF (%) | |
|---|---|---|
| | 2 (1 p/mm) | 4 (1 p/mm) |
| 28.3 | 89.7 | 64.0 |

In the further embodiment, the shape of the configured surface 18b of the fresnel lens 18 is changed so that the angle (AEP) of light emerging from the outermost peripheral position of the fresnel lens 18 is changed. The resolving power MTF is examined while changing the angle (AEP). In this example, the refractive index n of the convergently transmissive elements 16a is 1.505, the distribution constant of the refractive index g is 0.1847, the length Z is 18.895 mm, and the distance L is 20 mm. The thickness of the fresnel lens 18 is 2 mm and refractive index is 1.494. The fresnel lens 18 is arranged to contact the array 16 of convergently transmissive elements 16a. In this arrangement, the curvature of the fresnel lens 18 is set in a parabolic shape so that a light beam (referred to as the main light beam) parallel to the optical axis of the fresnel lens 18 emerges from the outermost peripheral position of the fresnel lens 18 at an angle (AEP), and the focal point is at a position on a line passing through the center of the fresnel lens 18. The resolving power MTF in this example is shown in the following table. It should be noted that the configured surface 18b is on the light incident side and the flat surface 18a is on the light emerging side.

| AEP (°) | MTF (%) | |
|---|---|---|
| | 2 (1 p/mm) | 4 (1 p/mm) |
| 10 | 99.7 | 98.9 |
| 20 | 98.1 | 92.7 |
| 30 | 88.7 | 61.1 |
| 40 | 88.9 | 61.5 |

As will be understood from this table, the obtained values for MTF are satisfactory even at an angle (AEP) of 40 degrees. Note that this result is obtained in an arrangement where the configured surface 18b is on the light incident side and the flat surface 18a is on the light emerging side.

It can be said that an image is formed substantially in a plane, however, the imaging surface is somewhat curved. Therefore, if the focal point is at a position on a line passing through the center of the fresnel lens 18, a value for MTF at a peripheral position may be reduced. In the above table, the values for MTF at the angles (AEP) of 10 to 30 degrees are obtained when the focal point is at a position on a line passing through the center of the fresnel lens 18, but the value for MTF at the angle (AEP) of 40 degrees is obtained when the focal point is adjusted so that a value for MTF at the center of the fresnel lens 18 is identical to a value for MTF at the outermost peripheral position of the fresnel lens 18.

The following table shows the result of a test regarding resolving power MTF obtained when the flat surface 18a is on the light incident side and the configured surface 18b is on the light emerging side and the other conditions are similar to those of the above example. This result should be compared with resolving force MTF obtained when the configured surface 18b is on the light incident side and the flat surface 18a is on the light emerging side.

| AEP (°) | MTF (%) | |
|---|---|---|
| | 2 (1 p/mm) | 4 (1 p/mm) |
| 10 | 95.8 | 84.0 |
| 12 | 90.8 | 65.0 |
| 13 | 86.9 | 55.4 |
| 14 | 81.6 | 41.5 |
| 15 | 76.1 | 28.8 |
| 20 | 26.6 | 5.5 |

According to an estimation by observing the screen, it has been found that a produced image is good when a value for MTF is greater than 50 percent under the condition of 4 (1 p/mm). Therefore, in this comparative test, it can be said that an angle (AEP) equal to or lower than 13 degrees is satisfactory but the curvature of the fresnel lens is limited to this extent.

The inventors further tried to analyze the reason why the resolving power MTF is reduced when the flat surface 18a is on the light incident side and the configured surface 18b is on the light emerging side.

Figure 7:
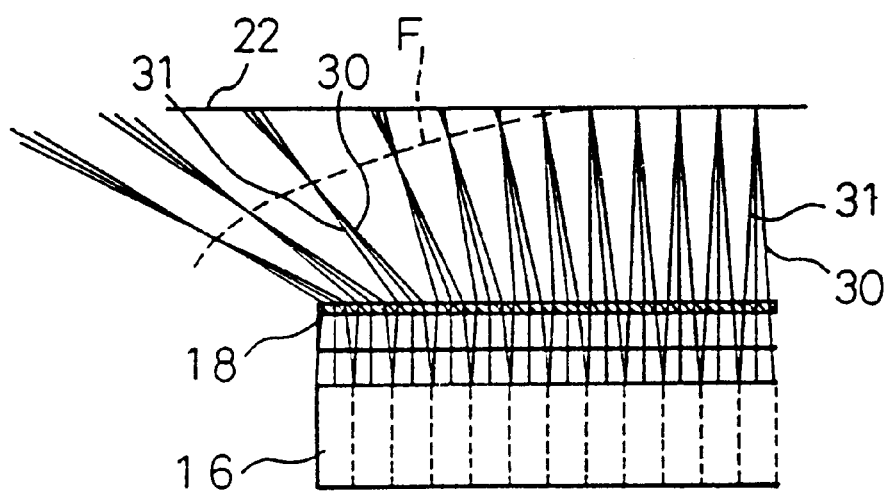
FIG. 7 is a view illustrating the imaging surface and how the resolving power is reduced.

As shown in FIG. 7, it has been found that the focal length of the fresnel lens 18 becomes shorter as the position is displaced from the center of the fresnel lens 18 to the periphery thereof, and an imaging surface is distorted relative to the screen 22 as shown by the broken line F. In FIG. 7, the array 16 of the convergently transmissive elements 16a and the fresnel lens 18 are shown, but the fresnel lens 18 is arranged such that the configured surface 18b is on the light emerging side.

In the analysis of the distorted imaging surface, the angle (AIM) between light beams 30 and 31 which are inclined to the main light beam on either side of the main light beam at identical angles relative to the main light beam is noted. The angle (AIM) between light beams 30 and 31 becomes smaller when light is made incident to the fresnel lens 18, and the angle (AIM) becomes greater when light emerges from the fresnel lens 18, regardless of which surface is on the light incident side. This tendency is stronger as the angle between the incident or merging light and the incident or emerging surface becomes greater, that is, this tendency is stronger with respect to the configured surface 18b. Therefore, the angle (AIM) between light beams 30 and 31 becomes greater in the arrangement where light emerges from the configured surface 18b, and an image is formed far from the screen 22 as the angle (AIM) becomes greater, with the result that the resolving power MTF is reduced. The angle (AIM) does not become as great in the arrangement where light emerges from the flat surface 18a, and in this case, it is possible to form an image on the screen 22.

Figure 10:
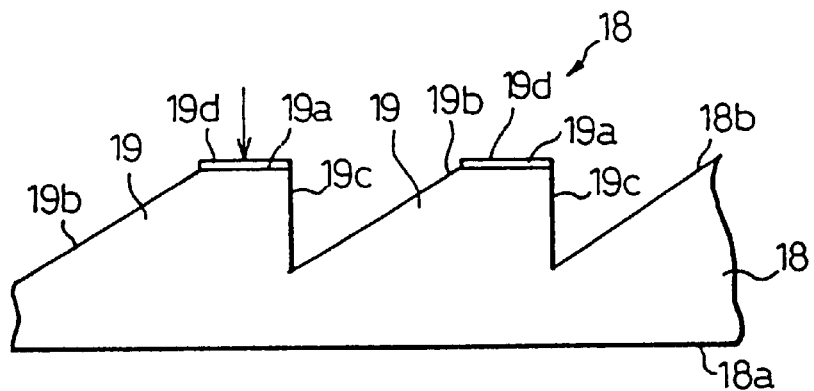
FIG. 10 is a cross-sectional view of a portion of the fresnel lens of FIGS. 8 and 9.

FIG. 10 shows the details of the fresnel lens 18 of FIG. 1. As described above, the fresnel lens 18 has the flat surface 18a and the configured surface 18b with concentrically periodic ridges 19. Each of the ridges 19 includes a flat crest 19a extending generally parallel to the flat surface 18a and an inclined surface 19b extending from the flat crest 19a toward the flat surface 18a. A minor surface 19c which is perpendicular to the flat surface 18a in FIG. 10 is arranged on the opposite side of the flat crest 19a from the inclined surface 19b. A shading layer 19d is provided on the flat crest 19a of each of the ridges 19. The shading layer 19d can be easily formed by printing since the flat crest 19a is parallel to the flat surface 18a.

Figure 11:
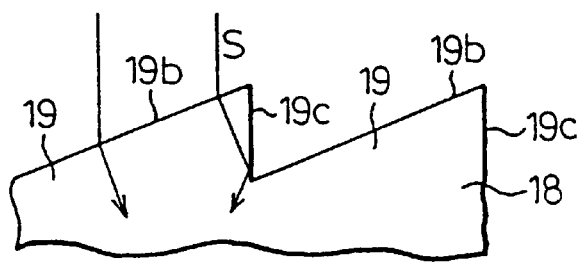
FIG. 11 is a cross-sectional view of a conventional fresnel lens.

FIG. 11 shows a conventional fresnel lens 18 having ridges 19. It will be understood that the flat crest 19a of FIG. 10 is formed by cutting the apex of the ridge 19 of FIG. 10. In the conventional fresnel lens 18 shown in FIG. 11, there is a problem of a straying beam inducing a ghost. That is, if light S is made incident to the inclined surface 19b at a position near the surface 19c, light S is reflected by the minor surface 19c and changes its course in an uncontrolled direction to thereby induce a ghost. The shading layer 19d is provided to solve this problem.

As will be understood from FIG. 8, the shape or the slope of the ridges 19 changes depending on the positions of the ridges 19 and it is preferable that the flat crests 19d have varying widths depending on the positions of the ridges 19.

Figure 12:
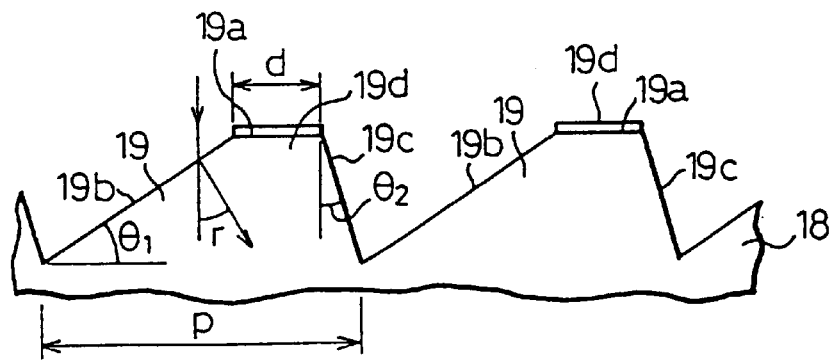
FIG. 12 is similar to FIG. 10, but includes several dimensional characters for calculating the width of the shading layer on the flat crest of the ridge of the configured surface of the fresnel lens.

As shown in FIG. 12, the surface 19c may be inclined relative to the flat surface 18a for the reason of fabrication of the fresnel lens 18. As will be apparent, the main inclined surface 19b arranged on one side of the flat crest 19a is designed such that light is mainly incident to the body of the fresnel lens 18 from the main inclined surface 19b, and the minor inclined surface 19c is arranged on the other side of the flat crest 19a from the main inclined surface 19b.

Preferably, the width of the flat crest 19a is determined by the following relationship:

$$d = p \frac{\tan r}{\tan(90 - \theta 1) + \tan r} \times \left[1 - \frac{\tan \theta 2}{\tan r}\right] \quad (1)$$

where d is the width of the flat crest 19a, p is the pitch of the ridges 19, r is the angle of a major light ray made incident to the body from the main inclined surface 19a relative to the axis, $\theta_1$ is the angle the main inclined surface 19b relative to the flat surface 18a, and $\theta_2$ is the angle of the minor inclined surface 19c relative to the axis of the fresnel lens 18.

Figure 13:
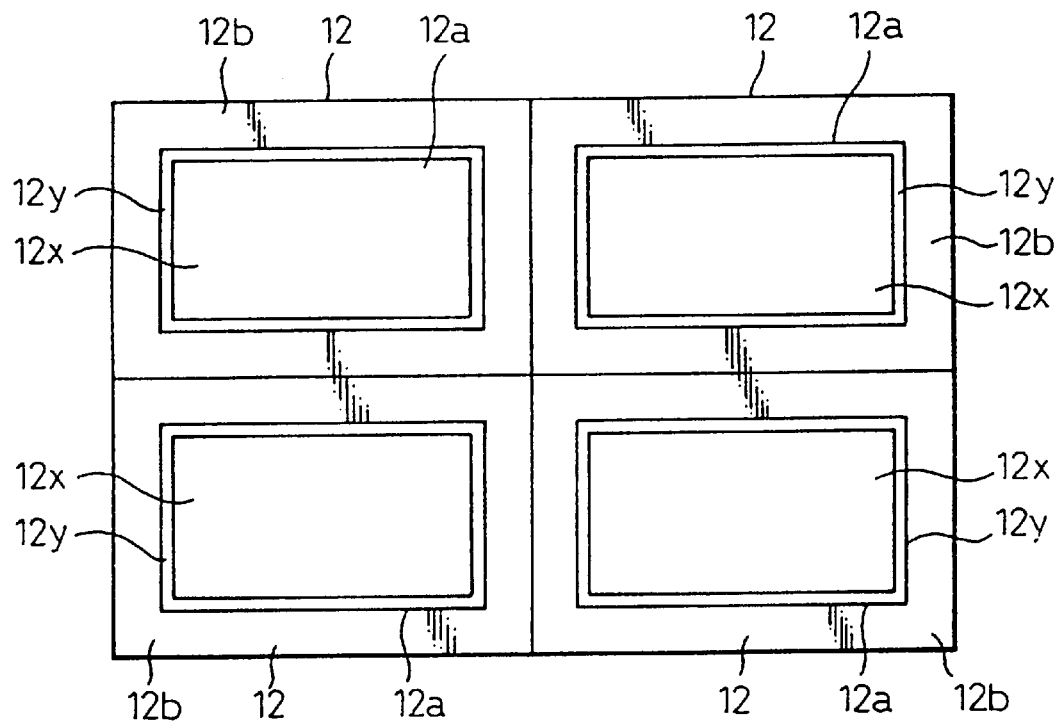
FIG. 13 is a plan view of the modified liquid crystal display panels.
Figure 17:
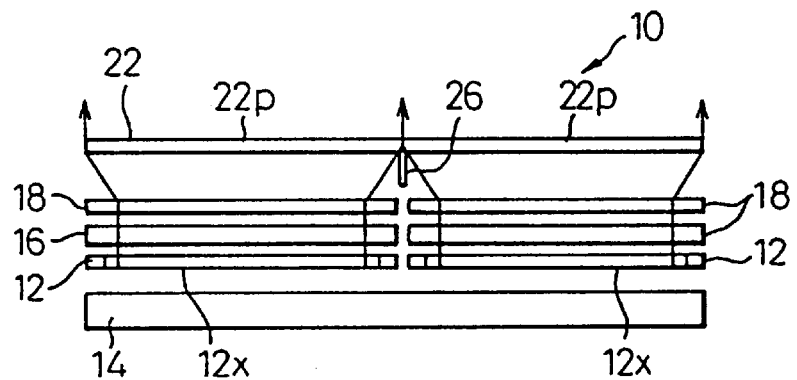
FIG. 17 is a diagrammatic cross-sectional view of a liquid crystal display device similar to the arrangement of FIG. 13.
Figure 18:
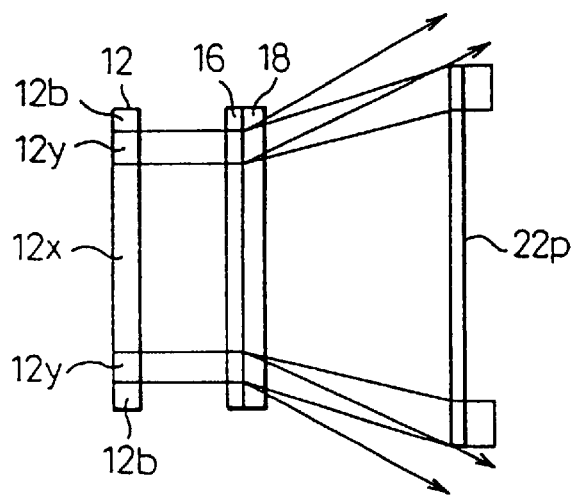
FIG. 18 is a cross-sectional view illustrating the course of light emerging from the main display area and the peripheral compensating area to the screen.

FIGS. 13, 17 and 18 show the modified liquid crystal display device 10, which includes four sets of the liquid crystal display panels 12, the arrays 16 of convergently transmissive elements 16a and the fresnel lenses 18, and a screen 22. The four sets are arranged in respective quarter portions in a rectangular region. The screen 22 has a total display area four times greater than a predetermined display area 22p necessary to receive an image from one set of the liquid crystal display panel 12, the array 16 of convergently transmissive elements and the fresnel lens 18. That is, the screen 22 has a predetermined display area 22p for each of the liquid crystal display panel 12.

A partition 26 is arranged on or near the screen 22 between two adjacent sets of the liquid crystal display panels 12, the arrays 16 of convergently transmissive elements and the fresnel lenses 18 for preventing light from straying from one set into the adjacent set.

Each liquid crystal display panel 12 includes an effective display region 12a and a non-display region 12b around the effective display region 12a, as described with reference to FIG. 2. The effective display region 12a is further divided into a main display area 12x and a peripheral compensating area 12y. The main display area 12x forms an image on the predetermined display area 22p via the array 16 of convergently transmissive elements and the fresnel lens 18. The peripheral compensating area 12y forms an image just outside the predetermined display area 22p via the array 16 of convergently transmissive elements and the fresnel lens 18. That is, the peripheral compensating area 12y does not contribute to the formation of the actual image on the screen 22, but compensates for a loss in brightness in the peripheral region of the liquid crystal display panel 12. As an example, the effective display region 12a includes 640×480 pixels, and the main display area 12x includes 620×465 pixels.

Figure 14:
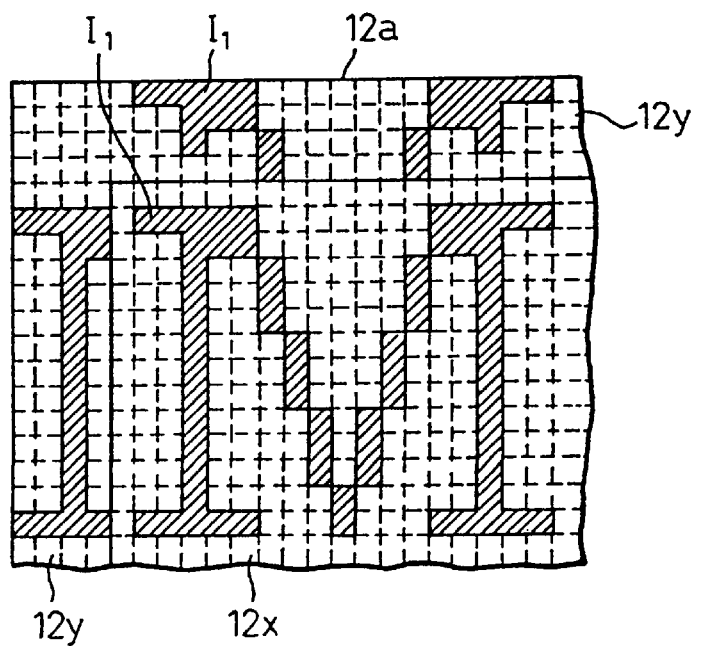
FIG. 14 is a view illustrating the pictures produced by the main display area and the peripheral compensating area of the quid crystal display panel.

As shown in FIG. 14, the peripheral compensating area 12y of the liquid crystal display panel 12 is controlled to provide an image $I_1$ which is generally identical to a portion $I_1$ of an image delivered from the main display area 12x of the liquid crystal display panel 12 near the peripheral compensating area 12y.

Figure 15:
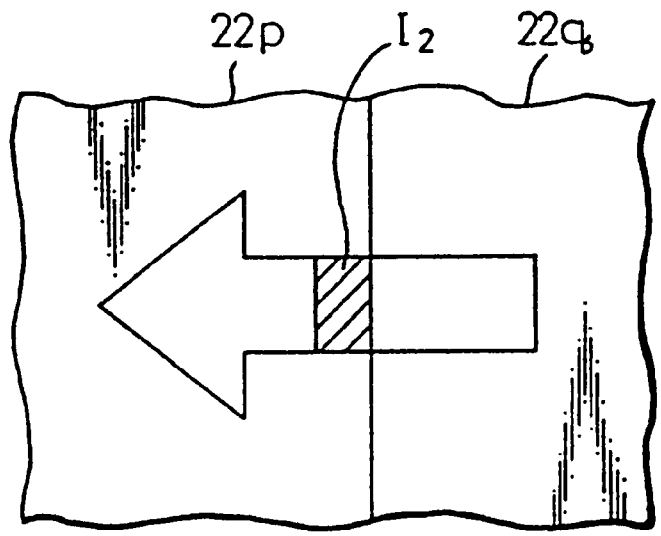
FIG. 15 is a view illustrating the image on the screen produced by two adjacent liquid crystal display panels.
Figure 16:
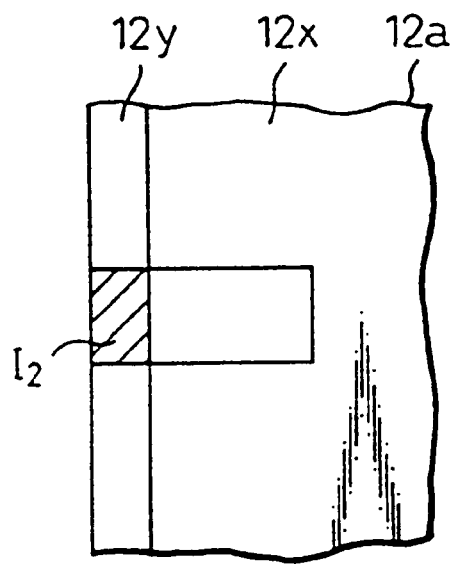
FIG. 16 is a view illustrating the pictures produced by the main display area and the image of the peripheral compensating area of the liquid crystal display panel of FIG. 15.

As alternatively shown in FIGS. 15 and 16, the peripheral compensating area 12y of the liquid crystal display panel 12 is controlled to provide an image $I_2$ which is generally identical to a portion $I_2$ of an image delivered from the main display area 12x of the adjacent liquid crystal display panel 12 near the peripheral compensating area 12y of said one liquid crystal display panel 12.

Figure 19:
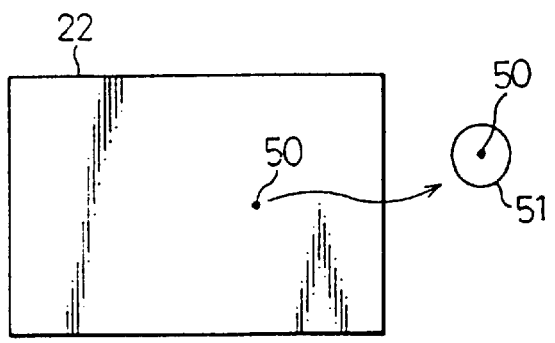
FIG. 19 is a plan view illustrating an element of an image on a screen.
Figure 20:
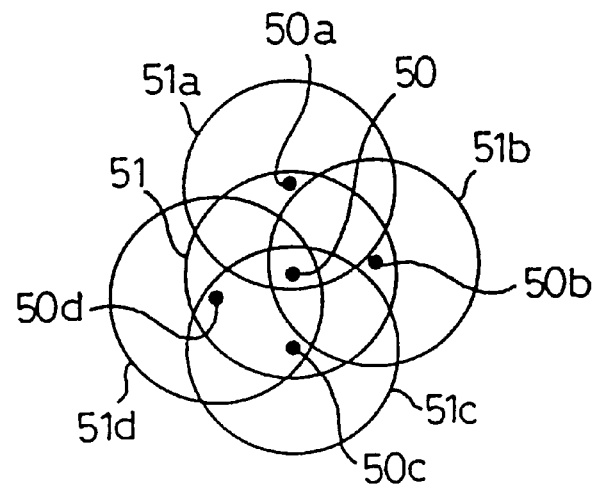
FIG. 20 is a plan view of several elements of an image on a screen.
Figure 21:
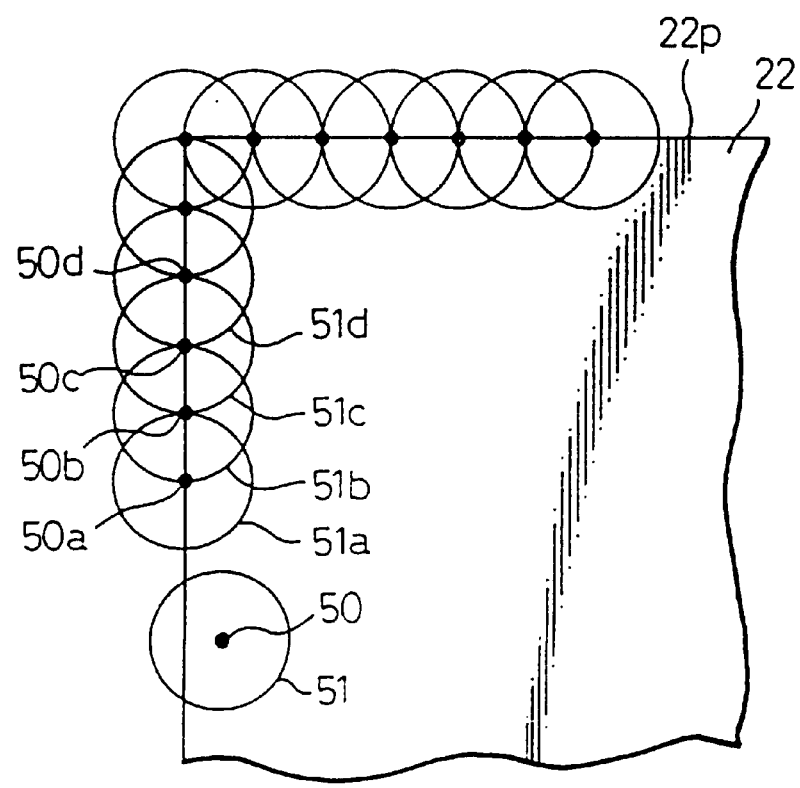
FIG. 21 is a view illustrating how the brightness of the image at the peripheral region of the screen is reduced.

FIG. 19 shows an element 50 of an image on a screen 22. The element 50 should be a point at which several light beams are focussed, but in fact, light beams may scatter to a certain region 51 due to an aberration of the magnifying fresnel lens 18. Therefore, the brightness of the element 50 may be reduced. FIG. 20 shows several elements 50, 50a, 50b, 50c, and 50d, with their scattering regions 51, 51a, 51b, 51c, and 51d. The element 50 receives light from the other elements 50a, 50b, 50c, and 50d and the brightness of the element 50 may be compensated to some extent. FIG. 21 shows a peripheral portion of the screen 22 when the peripheral compensating area 12y is not provided. There are several elements 50, 50a, 50b, 50c, and 50d, with their scattering regions 51, 51a, 51b, 51c, and 51d on the peripheral portion of the screen 22, but the brightness of these elements may not be compensated since there are not surplus light components outside the predetermined display area 22p.

As shown in FIG. 18, the peripheral compensating area 12y produces light outside the predetermined display area 22p and does not contribute to the formation of an actual image, but light emerged from the peripheral compensating area 12y may include scattered light components which compensate for the reduced brightness on the peripheral portion of the screen 22.

What is claimed is:

1. A display device comprising:

at least one image modulator;

an imaging device receiving light from said at least one image modulator for forming an erect and real image;

a fresnel lens including a body having a flat surface and a configured surface with periodic ridges, the fresnel lens being arranged so that light is made incident from the imaging device to the configured surface of the fresnel lens;

a screen receiving light from said at least one image modulator via the imaging device and the fresnel lens; and wherein an angle (AEP) of light emerging from an outermost portion of the fresnel lens relative to a line normal to the fresnel lens is in a range of between approximately 13 and 40 degrees.

2. A display device according to claim 1, wherein each of the ridges includes a flat crest extending generally parallel to the flat surface and at least one inclined surface extending from the flat crest toward the flat surface, and a shading layer is provided on the flat crest of each of the ridges.

3. A display device according to claim 2, wherein the flat crests having varying widths depending on the positions of the ridges.

4. A display device according to claim 3 wherein the at least one inclined surface comprises a main inclined surface arranged on one side of the flat crest and designed such that light is mainly incident to the body from the main inclined surface, and a minor inclined surface arranged on the other side of the flat crest from the main inclined surface.

5. A display device according to claim 4, wherein the width of the flat crest is determined by the following relationship:

$$d = p \frac{\tan r}{\tan(90 - \theta_1) + \tan r} \times \left[1 - \frac{\tan \theta_2}{\tan r}\right]$$

where d is the width of the flat crest, p is the pitch of the ridges, r is the angle of a major light ray made incident to the body from the main inclined surface relative to the axis, $\theta_1$ is the angle of the main inclined surface relative to the flat surface, and $\theta_2$ is the angle of the minor inclined surface relative to the axis.

6. A display device according to claim 1, wherein said at least one image modulator comprises a plurality of liquid crystal display panels, and the imaging device and the fresnel lens are arranged for every liquid crystal display panel.

7. A display device according to claim 6, wherein four sets of the liquid crystal display panels, the imaging devices and the fresnel lenses are arranged, with each set arranged in respective quarter portions in a rectangular region, the screen having a total display area four times greater than the display area necessary to receive an image from one set of the liquid crystal display panel, the imaging device and the fresnel lens.

8. A display device according to claim 7, wherein a partition is arranged on or near the screen between two adjacent sets of the liquid crystal display panels, the imaging devices and the fresnel lenses, whereby the partition prevents light from straying from one set into an adjacent set.

9. A display device according to claim 1, wherein the screen has a predetermined display area, and said at least one image modulator has a main display area and a peripheral compensating area arranged such that the main display area forms an image on the predetermined display area via the imaging device and the fresnel lens and the peripheral compensating area forms an image just outside the predetermined display area via the imaging device and the fresnel lens.

10. A display device according to claim 9, wherein said peripheral compensating area of said at least one image modulator is controlled to provide an image which is generally identical to a portion of an image delivered from the main display area of the at least one image modulator near the peripheral compensating area.

11. A display device according to claim 9, wherein said at least one image modulator comprises a plurality of liquid crystal display panels, and the imaging device and the fresnel lens are arranged for every liquid crystal display panel.

12. A display device according to claim 11, wherein four sets of the liquid crystal display panels, the imaging devices and the fresnel lenses are arranged, with each set arranged in respective quarter portions in a rectangular region, the screen having a total display area four times greater than a display area necessary to receive an image from one set of the liquid crystal display panel, the imaging device and the fresnel lens.

13. A display device according to claim 12, wherein a partition is arranged on or near the screen between two adjacent sets of the liquid crystal display panels, the imaging devices and the fresnel lenses, for preventing light from straying from one set into the adjacent set.

14. A display device according to claim 11, wherein between two adjacent liquid crystal display panels, said peripheral compensating area of one liquid crystal display panel is controlled to provide an image which is generally identical to a portion of an image delivered from the main display area of the adjacent liquid crystal display panel near the peripheral compensating area of said one liquid crystal display panel.

15. A display device comprising:
at least one image modulator;
an optical lens for magnifying an image output by said at least one image modulator; and
a screen for receiving an image from said at least one image modulator via said optical lens;
wherein the screen has a predetermined display area, and said at least one image modulator has a main display area and a peripheral compensating area arranged such that the main display area forms an image on the predetermined display area via said optical lens and the peripheral compensating area forms an image just outside the predetermined display area via said optical lens.

16. A display device according to claim 15, wherein said at least one image modulator comprises a plurality of liquid crystal display panels, and an imaging device and a fresnel lens are arranged for every liquid crystal display panel.

17. A display device comprising:
at least one image modulator;
an imaging device receiving light from said at least one image modulator for forming an erect and real image;
a fresnel lens including a body having a flat surface on one side thereof and a configured surface on the opposite side thereof, said configured surface having periodic ridges, wherein each of the ridges includes a flat crest extending generally parallel to the flat surface and at least one inclined surface extending from the flat crest toward the crest of each of the ridges, and the fresnel lens being arranged so that light is made incident from the imaging device to the configured surface of the fresnel lens, further wherein the flat crests have varying widths depending on the positions of the ridges; and
a screen receiving light from said at least one image modulator via the imaging device and the fresnel lens.

18. A display device according to claim 17, wherein the at least one inclined surface comprises a main inclined surface arranged on one side of the flat crest and designed such that light is mainly incident to the body from the main inclined surface, and a minor inclined surface arranged on the other side of the flat crest from the main inclined surface.

19. A display device according to claim 18, wherein the width of the flat crest is determined by the following relationship:

$$d = p \frac{\tan r}{\tan(90 - \theta_1) + \tan r} \times \left[1 - \frac{\tan \theta_2}{\tan r}\right]$$

where d is the width of the flat crest, p is the pitch of the ridges, r is the angle of a major light ray made incident to the body from the main inclined surface relative to the axis, $\theta_1$ is the angle of the main inclined surface relative to the flat surface, and $\theta_2$ is the angle of the minor inclined surface relative to the axis.

20. A display device according to claim 17, wherein a shading layer is provided on the flat crest of the ridges.

21. A display device comprising:
at least one image modulator;
an imaging device receiving light from said at least one image modulator for forming an erect and real image;

a fresnel lens including a body having a flat surface and a configured surface with periodic ridges, the fresnel lens being arranged so that light is made incident from the imaging device to the configured surface of the fresnel lens; and a screen receiving light from said at least one image modulator via the imaging device and the fresnel lens and wherein the screen has a predetermined display area, and said at least one image modulator has a main display area and a peripheral compensating area arranged such that the main display area forms an image on the predetermined display area via the imaging device and the fresnel lens and the peripheral compensating area forms an image just outside the predetermined display area via the imaging device and the fresnel lens.

22. A display device according to claim 21, wherein said peripheral compensating area of said at least one image modulator is controlled to provide an image which is generally identical to a portion of an image delivered from the main display area of the at least one image modulator near the peripheral compensating area.

23. A display device according to claim 21, wherein said at least one image modulator comprises a plurality of liquid crystal display panels, and the imaging device and the fresnel lens are arranged for every liquid crystal display panel.

24. A display device according to claim 23, wherein between two adjacent liquid crystal display panels, said peripheral compensating area of one liquid crystal display panel is controlled to provide an image which is generally identical to a portion of an image delivered from the main display area of the adjacent liquid crystal display panel near the peripheral compensating area of said one liquid crystal display panel.

25. A display device according to claim 23, wherein four sets of the liquid crystal display panels, the imaging devices and fresnel lenses are arranged, with each set arranged in respective quarter portions in a rectangular region, the screen having a total display area four times greater than a display area necessary to receive an image from one set of the liquid crystal display panel, the imaging devices and the fresnel lens.

26. A display device according to claim 25, wherein a partition is arranged on or near the screen between two adjacent sets of the liquid crystal display panels, and imaging devices, and the fresnel lenses, whereby the partition prevents light from straying from one set into an adjacent set.

* * * * *